March 15, 1966  W. D. VOELKER  3,240,845
METHOD FOR THE PRODUCTION OF CONTAINER BLANKS
Filed Nov. 23, 1962
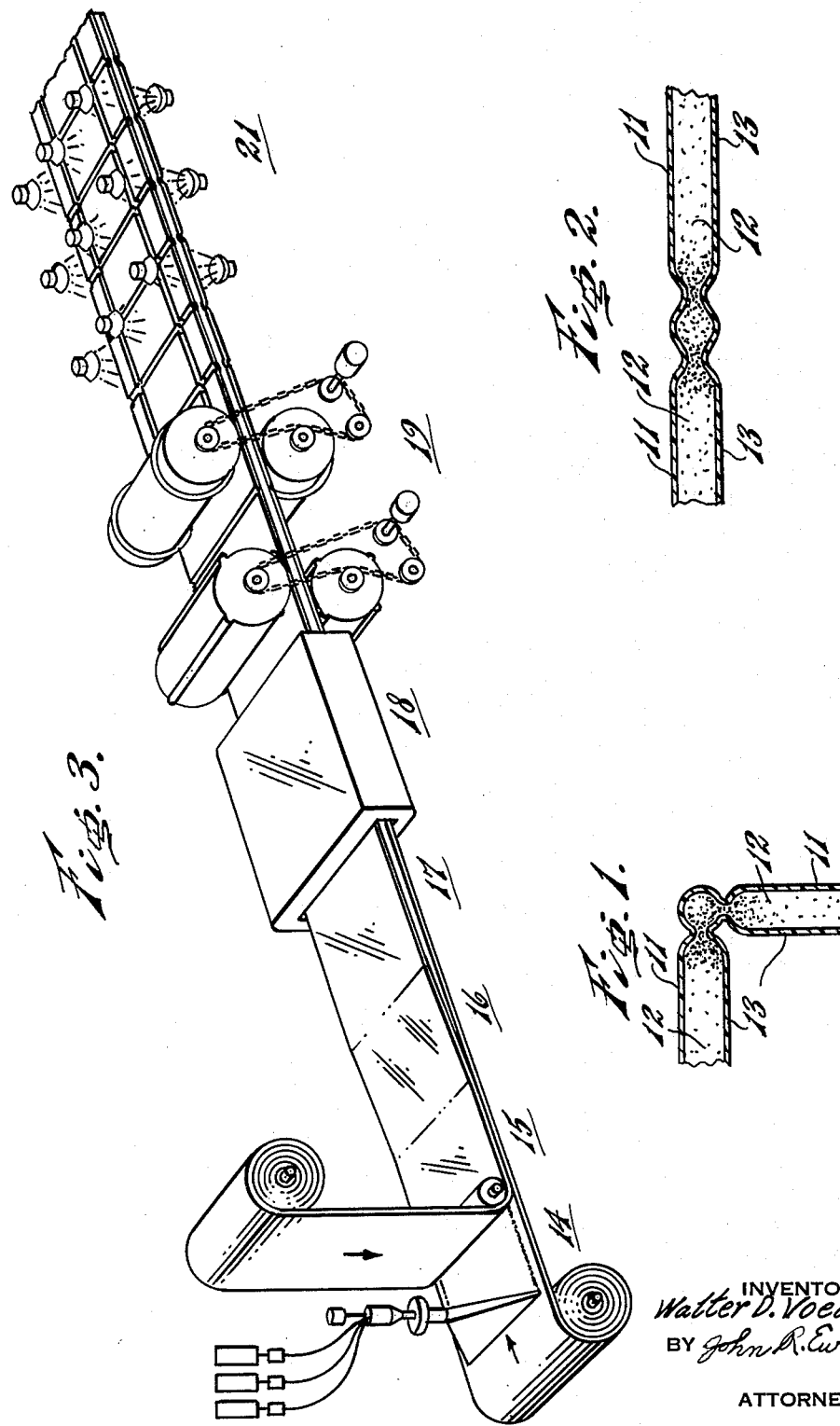
INVENTOR
Walter D. Voelker
BY John R. Ewbank
ATTORNEY United States Patent Office 3,240,845
Patented Mar. 15, 1966

3,240,845
METHOD FOR THE PRODUCTION OF
CONTAINER BLANKS
Walter D. Voelker, Philadelphia, Pa., assignor, by mesne assignments, to Allied Chemical Corporation, New York, N.Y., a corporation of New York
Filed Nov. 23, 1962, Ser. No. 239,619
2 Claims. (Cl. 264—45)

This invention relates to the construction of containers such as the cartons employed in a manner similar to the use of corrugated paper cartons for the shipment of various articles.

Heretofore it has been recognized that a sandwich structure comprising strong facing sheets and an intermediate layer of semi-rigid plastic foam has many of the advantages of corrugated cardboard for production of cartons but is superior thereto as regards insulation characteristics, moisture permeability and other important properties. Heretofore there have been suggestions that sandwich panels comprising polystyrene foam be employed in carton construction. For example, Lane Patent 2,770,406 suggests that a narrow band of compressed foam can be formed in the sandwich structure in the manufacture of a blank for a collapsible carton.

In accordane with the present invention containers are prepared from sandwich structures comprising facing sheets and a core of polyurethane foam, and the corner portions of the container are characterized by a plurality of grooves shaped into the structure prior to the completion of the chemical reactions among the hydroxyl groups and isocyanato groups. By reason of the combination of the plurality of grooves and the utilization of heat to promote further chemical reactions between the hydroxyl groups and isocyanato groups subsequent to the groove formation, corner portions for a container may be prepared.

The nature of the invention is further clarified by reference to the accompanying drawings. FIG. 1 is a schematic showing of a corner of a container prepared in accordance with the invention. FIG. 2 is a schematic showing of a sandwich structure having grooves formed therein in accordance with the present invention. FIG. 3 is a schematic showing of a method of producing the carton blanks.

Referring now in detail to the drawings there is shown in FIG. 1 an edge portion of a container comprising an outer face 11, a core of semi-rigid polyurethane foam 12 and an inner face 13. It is generally desirable to employ kraft paper as the facing sheet for both the inner and outer sheets 11 and 13 respectively. An appropriate formulation for the production of semi-rigid polyurethane foam suitable for container construction is as follows:

| | Parts by weight |
|---|---|
| Technical grade of nonapropoxysorbitol, such as tris (tripropyleneether) sorbitol, or other propylene oxide adduct of sorbitol having a molecular weight of the general magnitude of 722, or conveniently designated as propsorb 700 | 100 |
| Polyphenylenepolyisocyanate | 125 |
| Triethylenediamine catalyst | 0.5 |
| Dibutyltindilaurate catalyst | 0.1 |
| Silicone surfactant of type soluble in water | 1.5 |
| Trichlorofluoromethane | 29 |

The sandwich structure may be produced as indicated schematically in FIG. 3 by advancing the sandwich precursor through a plurality of zones including a preliminary curing zone 18. The precursor is prepared by advancing the kraft paper through zones such as a coating zone 14, creaming zone 15, rising zone 16, gel strength development zone 17 and into the preliminary curing zone 18. As the semi-rigid sandwich structure leaves the preliminary curing zone, it has sufficient crushing strength and tensile strength to be handled in a variety of manufacturing operations, but it lacks the optimum strength properties attainable from the formulation.

Particular attention is called to a scoring zone 19 in which the partially cured polyurethane foam sandwich is subjected to controlled pressure to form grooves adjacent to each of the potential corner bead members 20. The elasticity of the foam in the semi-cured sandwich is such that the compression of the scoring zone does not significantly crush brittle cell walls but instead the partially cured foam has sufficient adhesiveness that the scoring operation tends to adhere together permanently the several layers of the foam core. As shown in FIG. 2, the scoring operation does not bring about the pushing of the facing sheets into a second bond with each other but instead the grooves formed on each side of the corner bead are so shallow that they generally do not exceed much more than one third of the thickness of the sandwich structure.

Particular attention is directed to the feature of stabilizing the semi-cured sandwich material subsequent to the scoring operation. Thus, as indicated schematically in FIG. 3 the sandwich structure, subsequent to the formation of the grooves indicating the fold lines, is subjected to an elevated temperature such as by passage through a stabilizing oven 21.

In the manufacture of a container in accordance with the present invention, the carton blank is folded along the fold lines and assembled into a carton in a manner resembling that of previous carton assembly procedures. By reason of the relative shallowness of the grooves on each side of the sandwich, and by reason of the substantially full thickness of the sandwich in the bead, the corner of the carton has remarkable strength. By reason of the heat treatment of the polyurethane foam subsequent to the scoring of the semi-cured sandwich the structure of the foam in the sandwich reinforces the strength of the corner. During the passage of the scored sandwich through the heat stabilizing zone the polyurethane foam core is transformed into a structure having greater crushing and tensile strength and the structure and densification of the foam adjacent to the corner bead is made more nearly incremental and gradual so that the existence of the corner does not end to impose a strain leading to rupture of the foam adjacent to the corner. Thus by virtue of the combination of the multiple grooves on both sides of the sandwich and the subsequent heat stabilization of the carton blank scored during its semi-cured condition the container has a strength and durability making it superior to some of the previously proposed cartons comprising plastic foam core.

Various modifications of the invention are possible without departing from the scope of the appended claims.

The invention claimed is:
1. A method for the production of container blanks formed of semi-rigid polyurethane foam sandwich material which method comprises forming a sandwich of partially cured semi-rigid polyurethane foam between a pair of facing sheets, scoring a closely spaced apart pair of grooves in each face of the foam sandwich, each of said grooves being disposed opposite a corresponding groove on the opposing sandwich face and extended to provide a groove depth less than about one third of the thickness of the fully cured sandwich, and subsequently heating the thus scored foam sandwich to complete the curing of the polyurethane foam; said grooves serving as fold lines for the blank so that upon folding of the blank the said grooves form a bead container corner integrally connected to the polyurethane sandwich container walls by a bridge of the polyurethane foam remaining between the opposing grooves.

2. The method of claim 1 wherein the facing sheets are kraft paper.

References Cited by the Examiner

UNITED STATES PATENTS

| | | | |
|---|---|---|---|
| 1,912,698 | 6/1933 | Forsman | 229—37 |
| 2,173,871 | 9/1939 | Zalkind | 229—37 XR |
| 2,301,309 | 11/1942 | Messer | 229—37 XR |
| 2,534,201 | 12/1950 | Hutter | 229—3.5 |
| 2,770,406 | 11/1956 | Lane | 229—3.5 |
| 3,012,283 | 12/1961 | Foster | 264—321 XR |
| 3,019,486 | 2/1962 | Stinson | 264 |
| 3,037,897 | 6/1962 | Pelley | 156—78 |
| 3,046,177 | 7/1962 | Hankins | 156—78 |
| 3,079,641 | 3/1963 | Knox et al. | 264 |
| 3,166,454 | 1/1965 | Voelker | 156—78 |

ALEXANDER H. BRODMERKEL, *Primary Examiner.*

FRANKLIN T. GARRETT, *Examiner.*